United States Patent
Miyazawa

(10) Patent No.: US 9,659,240 B2
(45) Date of Patent: May 23, 2017

(54) CARD READER

(71) Applicant: NIDEC SANKYO CORPORATION, Suwa-gun, Nagano (JP)

(72) Inventor: Shinya Miyazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/102,731

(22) PCT Filed: Dec. 9, 2014

(86) PCT No.: PCT/JP2014/082523
§ 371 (c)(1),
(2) Date: Jun. 8, 2016

(87) PCT Pub. No.: WO2015/087866
PCT Pub. Date: Jun. 18, 2015

(65) Prior Publication Data
US 2016/0314381 A1  Oct. 27, 2016

(30) Foreign Application Priority Data

Dec. 10, 2013 (JP) ................................. 2013-255218

(51) Int. Cl.
*G06K 13/08* (2006.01)
*G07F 7/08* (2006.01)
(Continued)

(52) U.S. Cl.
CPC ......... *G06K 13/085* (2013.01); *G06K 7/0021* (2013.01); *G06K 7/084* (2013.01); *G07F 7/0873* (2013.01)

(58) Field of Classification Search
USPC ...................................................... 235/449
See application file for complete search history.

(56) References Cited

U.S. PATENT DOCUMENTS 4,918,957 A * 4/1990 Eisermann ............. E05B 13/00
                                                             70/276
8,181,857 B1 * 5/2012 Lute ..................... G06Q 20/1085
                                                             235/379
(Continued)

FOREIGN PATENT DOCUMENTS

JP  H09212591 A   8/1997
JP  2005056376 A  3/2005
JP  2006155567 A  6/2006

OTHER PUBLICATIONS

International Search Report corresponding to Application No. PCT/JP2014/082523; Date of Mailing: Mar. 3, 2015, with English translation.

*Primary Examiner* — Michael G Lee
*Assistant Examiner* — David Tardif
(74) *Attorney, Agent, or Firm* — Cantor Colburn LLP

(57) ABSTRACT

A card reader may include a card insertion port; a card conveying passage; and a card lock mechanism. The card lock mechanism may include a motor; a lock member comprising a prevention pawl; and a power transmission mechanism structured to transmit power of the motor to the lock member. The power transmission mechanism may include a worm gear having a screw gear and a helical gear engaged with the screw gear. The screw gear may be disposed on a motor side relative to the helical gear in a transmitting direction of power from the motor to the lock member. The lock member may further include a teeth part in a fan shape. The teeth part may be driven through engagement of gears including the worm gear to move the prevention pawl.

18 Claims, 4 Drawing Sheets

(51) Int. Cl.
*G06K 7/00* (2006.01)
*G06K 7/08* (2006.01)

(56) References Cited

U.S. PATENT DOCUMENTS

2007/0087594 A1* 4/2007 Kosugi .................. G06F 1/186
 439/92
2016/0358044 A1* 12/2016 Kuwaki ............. G06K 13/0862

* cited by examiner

CARD READER

CROSS REFERENCE TO RELATED APPLICATIONS

This is the U.S. national stage of application No. PCT/JP2014/082523, filed on Dec. 9, 2014. Priority under 35 U.S.C. §119(a) and 35 U.S.C. §365(b) is claimed from Japanese Application No. 2013-255218, filed Dec. 10, 2013, the disclosure of which is incorporated herein by reference.

FIELD OF THE INVENTION

The present invention relates to a card reader structured to read data recorded in a card and to record data in a card.

BACKGROUND

Conventionally, a card reader has been widely utilized which is structured to read data recorded in a card and to record data in a card. In an industry such as a financial institution where a card reader is utilized, illegal acquisition of a card by a criminal who intentionally clogs the card in an inside of a card reader, i.e., so-called phishing has become a large issue. Therefore, conventionally, a card reader having a card lock mechanism for preventing phishing has been proposed (see, for example, Patent Literature 1).

In the card reader described in Patent Literature 1, the card lock mechanism includes a lock lever for preventing drawing of a card from a card insertion port. The lock lever is provided with lock teeth in a substantially triangular shape which is configured to contact with a card for preventing drawing of the card. The lock lever is turnably supported by a support pin. Further, the lock lever is connected with a motor through a connecting lever, a fan-shaped gear and a reduction gear train. The lock lever is turnable by power of the motor between a position where the lock teeth are retreated from a card conveying passage and a position where the lock teeth are contacted with the card. Further, the reduction gear train is structured of many gears. Therefore, in the card reader, a reduction gear ratio becomes large in a transmission path of power from the motor to the lock lever and thus, even when a small motor with small output is used, contact pressure of the lock teeth with a card can be secured.

In the card reader described in Patent Literature 1, when a card is abnormally stopped and the card is clogged in the card conveying passage, the card lock mechanism is operated and the lock teeth retreated from the card conveying passage are contacted with the card. In a state that the lock teeth are contacted with a card, the lock teeth are inclined to a rear side of the card reader as going toward the card. Therefore, when a card is going to be drawn out from a card insertion port, the lock teeth stick into the card and thereby drawing of the card from the card insertion port is prevented.

CITATION LIST

Patent Literature

[PTL 1] Japanese Patent Laid-Open No. 2006-155567

Criminal acts by a criminal have been sophisticated year by year and thus, we have found that, even in the card reader described in Patent Literature 1, phishing may be performed by a criminal. Specifically, we have found that phishing may be performed by a criminal so that the criminal inserts a certain tool from a card insertion port to separate the lock lever from a card in a state that the lock teeth are contacted with the card and draws the card from the card insertion port.

In the card reader described in Patent Literature 1, a reduction gear ratio in a transmission path of power from the motor to the lock lever is large and thus, even when a small motor is used, contact pressure of the lock teeth with a card can be secured. However, in the card reader, a reduction gear train is structured of many gears in order to increase a reduction gear ratio in the transmission path of power from the motor to the lock lever. Therefore, in the card reader, even when a small motor is used, the size of the card lock mechanism is large.

SUMMARY

In view of the problem described above, at least an embodiment of the present invention provides a card reader which is capable of reducing the size of the card lock mechanism and of surely preventing phishing.

To achieve the above, the present invention provides a card reader including a card insertion port into which a card is inserted and from which the card is ejected, a card conveying passage where the card inserted from the card insertion port is conveyed, and a card lock mechanism structured to prevent drawing of the card from the card insertion port when abnormality has been detected in conveyance of the card in the card conveying passage. The card lock mechanism includes a motor, a lock member which is formed with a prevention pawl configured to contact with the card for preventing drawing of the card and is moved between a contact position where the prevention pawl is contacted with the card and a retreated position where the prevention pawl is retreated from the card conveying passage by power transmitted from the motor, and a power transmission mechanism structured to transmit power of the motor to the lock member. The power transmission mechanism includes a worm gear structured of a screw gear and a helical gear engaged with the screw gear, and the screw gear is disposed on a motor side relative to the helical gear in a transmitting direction of power from the motor to the lock member.

In the card reader in accordance with at least an embodiment of the present invention, the power transmission mechanism structured to transmit power of the motor to the lock member includes the worm gear and a reduction gear ratio of the worm gear can be increased. Therefore, according to at least an embodiment of the present invention, even when the number of gears structuring the power transmission mechanism is reduced, a reduction gear ratio in a transmission path of power from the motor to the lock member can increased. Accordingly, in at least an embodiment of the present invention, even when a small motor is used, contact pressure of the prevention pawl with a card can be secured. As described above, in at least an embodiment of the present invention, even when the number of gears structuring the power transmission mechanism is reduced or, even when a small motor is used, contact pressure of the prevention pawl with a card can be secured. Therefore, while securing contact pressure of the prevention pawl with a card, the size of the card lock mechanism can be reduced.

In at least an embodiment of the present invention, the worm gear is disposed in the transmission path of power from the motor to the lock member. Therefore, even when a criminal tries to push the lock member in a direction from the contact position to the retreated position by using a certain tool inserted from the card insertion port, the helical gear structuring the worm gear is hardly turned. Accordingly, in at least an embodiment of the present invention, a situation can be prevented that the prevention pawl is moved until the contact condition of the prevention pawl with a card is released. Therefore, even when a criminal tries to draw a card in a contacted state with the prevention pawl from the card insertion port by using a tool, drawing of the card from the card insertion port can be prevented by operation of the prevention pawl. As a result, in at least an embodiment of the present invention, phishing can be prevented surely.

In at least an embodiment of the present invention, it is preferable that the card reader includes a magnetic head configured to perform at least one of reading of magnetic data recorded in the card and recording of magnetic data to the card, the card reader is structured so that the card formed in a substantially rectangular shape is conveyed in a short-side direction of the card and is processed, the magnetic head is disposed so as to face the card conveying passage from one side in a thickness direction of the card with respect to the card conveying passage, and the lock member is disposed on the one side in the thickness direction of the card with respect to the card conveying passage so that the prevention pawl is contacted with the card from the one side in the thickness direction of the card with respect to the card conveying passage. In other words, in at least an embodiment of the present invention, it is preferable that the lock member is disposed so that the prevention pawl is contacted with a face of a card on the side where a magnetic stripe is formed. According to this structure, even if a card is drawn by a criminal in a state that the prevention pawl is contacted with the card, a magnetic stripe of the card can be damaged by the prevention pawl. Therefore, even if a card is drawn by a criminal in a state that the prevention pawl is contacted with the card, the drawn card can be prevented from being used.

In at least an embodiment of the present invention, for example, the power transmission mechanism includes the screw gear fixed to an output shaft of the motor, a first rotation shaft to which the helical gear is fixed, a first spur gear which is fixed to the first rotation shaft, a second spur gear which is engaged with the first spur gear, a second rotation shaft by which the second spur gear is relatively turnably held, a third spur gear which is fixed to the second rotation shaft, two gear side pins which are fixed to a side face of the second spur gear so as to protrude in an axial direction of the second rotation shaft, and a shaft side pin which is fixed to the second rotation shaft so as to protrude to both sides in a radial direction of the second rotation shaft and to be capable of contacting with the two gear side pins. A pin clutch is structured of the two gear side pins and the shaft side pin, the pin clutch being configured to connect and disconnect power transmission between the second spur gear and the second rotation shaft in a power transmission path between the motor and the lock member. The lock member is formed with a teeth part which is engaged with the third spur gear, the card lock mechanism includes a fixed shaft which turnably holds the lock member or a turnable shaft which is turned together with the lock member, and the lock member is turned with the fixed shaft or the turnable shaft as a center to be moved between the contact position and the retreated position.

In at least an embodiment of the present invention, it is preferable that the card lock mechanism includes a fixed shaft which turnably holds the lock member or a turnable shaft which is turned together with the lock member, the lock member is turned with the fixed shaft or the turnable shaft as a center to be moved between the contact position and the retreated position. In a case that a turning direction of the lock member moved from the retreated position to the contact position is referred to as a first direction, when drawing force in an ejecting direction of the card is applied to the card in a state that the prevention pawl is contacted with the card, turning force in the first direction is applied to the lock member, and a tip end of the prevention pawl is formed in a pointed shape so as to stick into the card when drawing force in the ejecting direction of the card is applied to the card in the state that the prevention pawl is contacted with the card. According to this structure, even when a criminal tries to draw a card from the card insertion port in a state that the prevention pawl is contacted with the card, a tip end of the prevention pawl sticks into the card. Therefore, drawing of a card from the card insertion port can be prevented effectively.

As described above, in the card reader in accordance with at least an embodiment of the present invention, the size of the card lock mechanism can be reduced and phishing can be prevented surely.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings.
(Schematic Structure of Card Reader)

Figure 1:
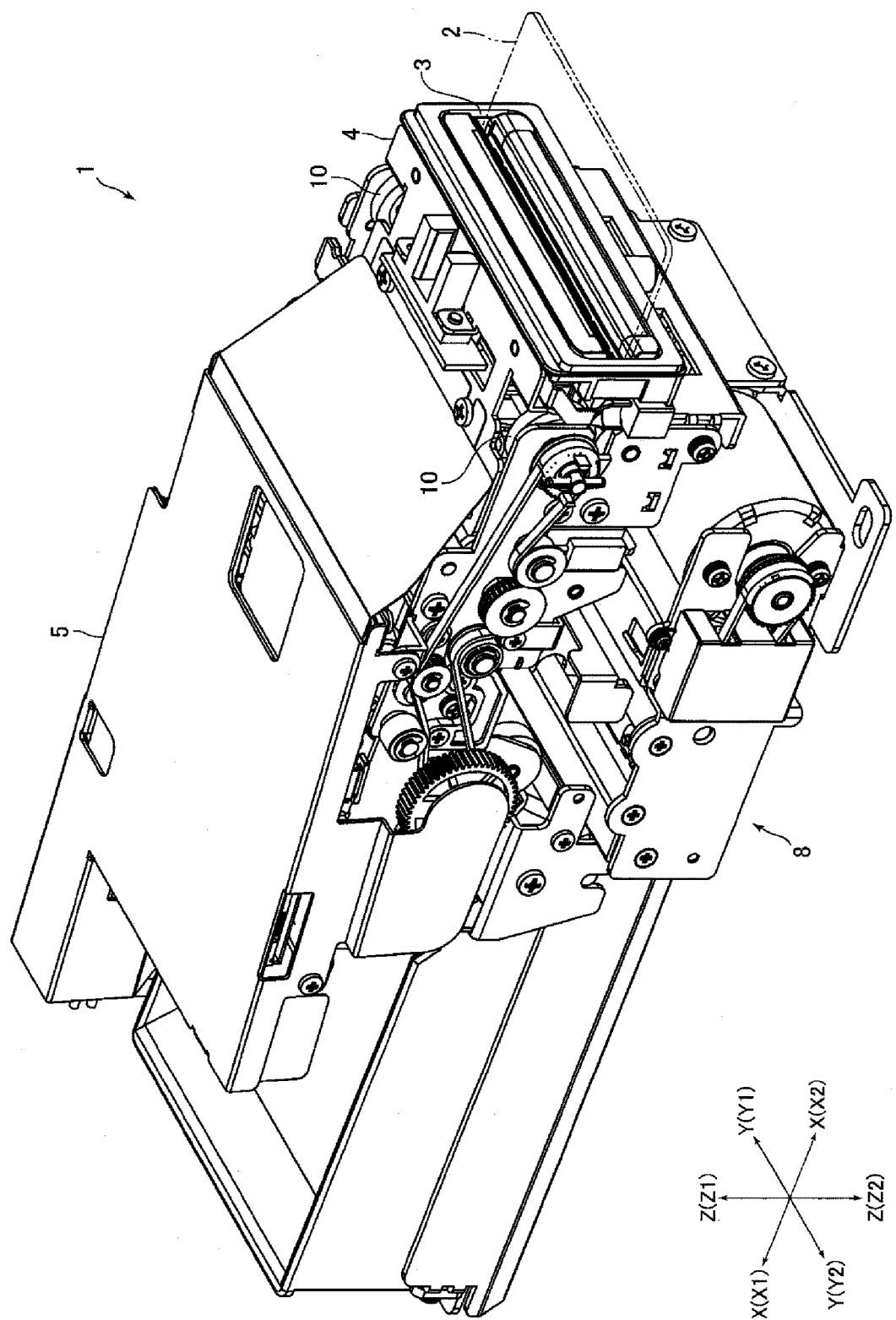
FIG. 1 is a perspective view showing a card reader in accordance with an embodiment of the present invention.
Figure 2:
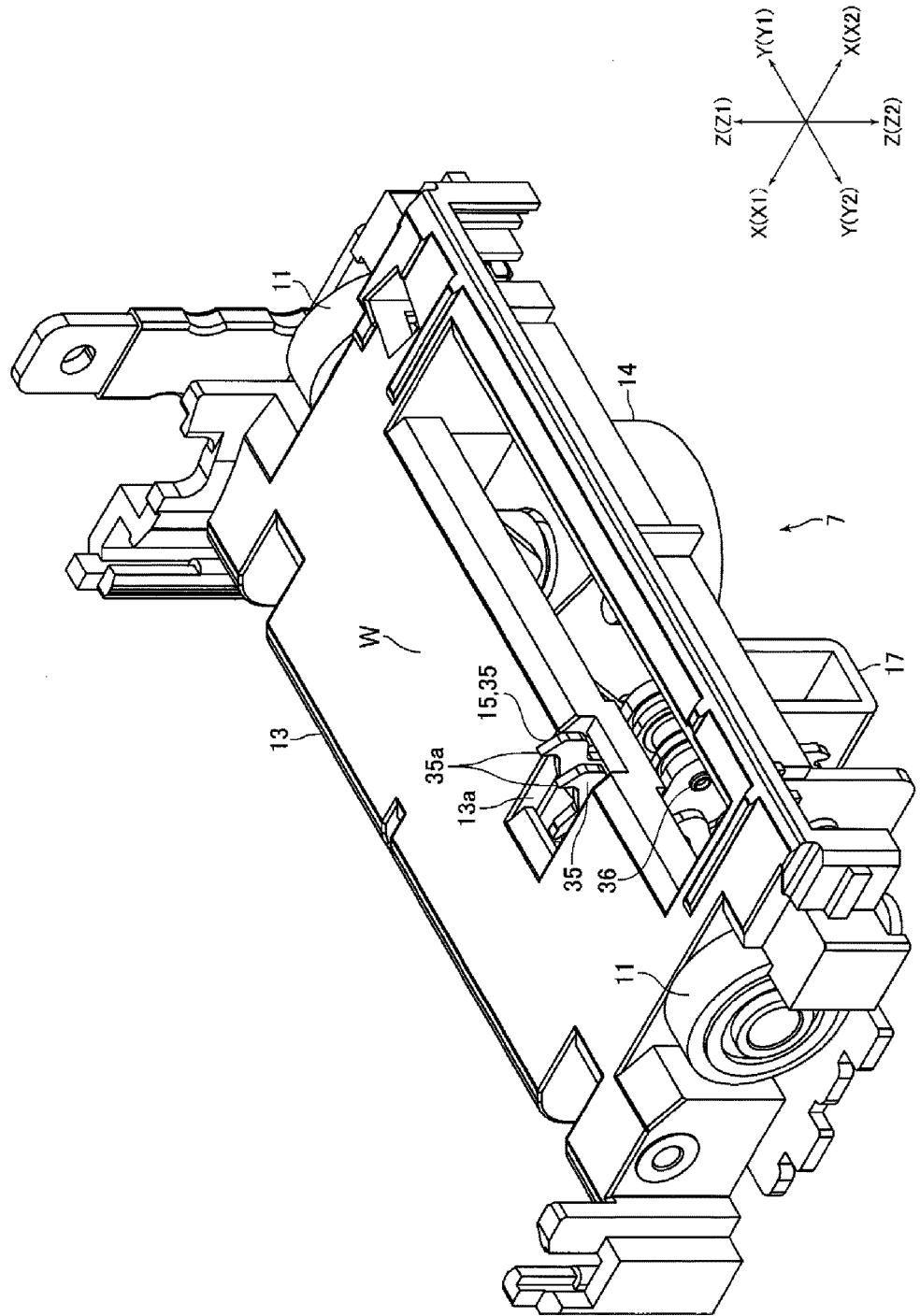
FIG. 2 is a perspective view showing a lower side portion relative to a card conveying passage of a card insertion part shown in FIG. 1.

FIG. 1 is a perspective view showing a card reader 1 in accordance with an embodiment of the present invention. FIG. 2 is a perspective view showing a lower side portion relative to a card conveying passage "W" of a card insertion part 4 shown in FIG. 1.

A card reader 1 in this embodiment is a device structured to perform at least one of reading of magnetic data recorded in a card 2 and recording of magnetic data to a card 2. The card reader 1 is mounted and used in a predetermined host apparatus such as an ATM (Automated Teller Machine). In other words, the card reader 1 in this embodiment is operated on the basis of command instructions from the predetermined host apparatus. The card reader 1 includes a card insertion part 4 formed with a card insertion port 3 where a card 2 is inserted into and ejected from, and a main body part 5. A card conveying passage "W" where a card 2 inserted into the card insertion port 3 is conveyed is formed in an inside of the card reader 1. The card conveying passage "W" is formed to be a passage for passing a card 2 which is conveyed from the card insertion port 3 and passed through the card insertion part 4 to the main body part 5. Further, the card reader 1 includes a card lock mechanism 7 for preventing drawing of a card 2 from the card insertion port 3 when abnormal conveyance of the card 2 in the card conveying passage "W" is detected.

In this embodiment, the host apparatus is structured so that, when an abnormal conveyance of a card 2 is detected, the host apparatus determines that abnormality such as a fraudulent act of a criminal has occurred and sends a command instruction for driving the card lock mechanism 7 to the card reader 1. Specifically, example cases that the host apparatus determines that an abnormal conveyance of a card 2 has occurred are as follows. For example, one case is that, when movement of a card 2 is not detected although the host apparatus has outputted a command for conveying a card 2, the host apparatus determines that the card 2 is abnormally stopped and the card 2 has been clogged in a card conveying passage "W". Another case is that a card 2 is moving along the card conveying passage "W" although conveyance of a card 2 is controlled to be stopped. Further, another case is that, although a sensor for detecting a position of a card which is moved in the card conveying passage "W" should not be responded, a card detection signal is outputted from the sensor. As described above, the host apparatus is structured so that, when an abnormal situation of the card reader 1 which does not correspond to its command is detected, the host apparatus determines that a fraudulent act by a criminal has been occurred and the card lock mechanism 7 is operated.

A card 2 is that made of vinyl chloride whose thickness is about 0.7-0.8 mm. A card 2 in this embodiment is a card with a magnetic stripe in conformity with the international standard (for example, ISO/IEC7811) or JIS standard (for example, JISX6302) and is formed in a substantially rectangular shape whose four corners are rounded. A rear face of the card 2 is formed with a magnetic stripe in which magnetic data is to be recorded. Further, an IC chip is incorporated in the card 2.

In this embodiment, a card 2 is conveyed in the "X" direction in FIG. 1 and the like. Specifically, a card 2 is taken in the "X1" direction and the card 2 is ejected in the "X2" direction. In other words, the "X" direction is a conveying direction of a card 2, the "X1" direction is a taking-in direction of a card 2 and the "X2" direction is an ejecting direction of the card 2. Further, in this embodiment, a card 2 is taken into the card reader 1 so that a short-side direction of the card 2 and the "X" direction are coincided with each other. Further, the card 2 is conveyed in the card reader 1 so that the short-side direction of the card 2 and the "X" direction are coincided with each other. In other words, the card reader 1 is structured so as to convey a card 2 in a short-side direction of the card 2 and perform predetermined processing.

The "Y" direction perpendicular to the "X" direction is a width direction of the card conveying passage "W" and is a longitudinal direction of a card 2 taken into the card reader 1 in a correct posture. Further, the "Z" direction in FIG. 1 and the like perpendicular to the "X" direction and the "Y" direction is a height direction in the card conveying passage "W" and is a thickness direction of a card 2 taken into the card reader 1. In this embodiment, the card reader 1 is disposed so that the "Z" direction and a vertical direction are coincided with each other. In the following descriptions, the "X" direction is referred to as a "front and rear direction", the "Y" direction is referred to as a "right and left direction", the "Z" direction is referred to as an "upper and lower direction". Further, the "X1" direction side is a "rear (back) side", the "X2" direction side is a "front" side, the "Y1" direction side is a "right" side, the "Y2" direction side is a "left" side, the "Z1" direction side is an "upper" side, and the "Z2" direction side is a "lower" side.

A card insertion part 4 is attached to a front end face of the main body part 5. The main body part 5 includes a magnetic head (not shown) configured to perform at least one of reading of magnetic data recorded in a card 2 and recording of magnetic data to a card 2, and IC contact points (not shown) configured to perform data communication with an IC chip incorporated into the card 2.

The magnetic head is disposed so as to face the card conveying passage "W" from a lower side with respect to the card conveying passage "W". Further, the magnetic head is mounted on a carriage (not shown) which is movable in the right and left direction. The carriage is connected with a carriage drive mechanism 8 and the magnetic head is moved in the right and left direction together with the carriage. Further, the magnetic head is moved up and down between a position where the magnetic head is capable of contacting with a card 2 and a position where the magnetic head is retreated from the card conveying passage "W". The IC contact points are disposed so as to face the card conveying passage "W" from an upper side with respect to the card conveying passage "W". Further, the IC contact points are fixed to an IC contact block. The IC contact block is connected with an IC contact block drive mechanism and the IC contact points are moved up and down between a position where the IC contact points are capable of contacting with a card 2 and a position where the IC contact points are retreated from the card conveying passage "W".

The main body part 5 includes conveying rollers 10 (see FIG. 1) configured to abut with a card 2 and convey the card 2, and pad rollers 11 (see FIG. 2) oppositely disposed to the conveying rollers 10. The conveying rollers 10 are disposed so as to face the card conveying passage "W" from an upper side. The pad rollers 11 are disposed so as to face the card conveying passage "W" from a lower side.

(Structure of Card Lock Mechanism)

Figure 3:
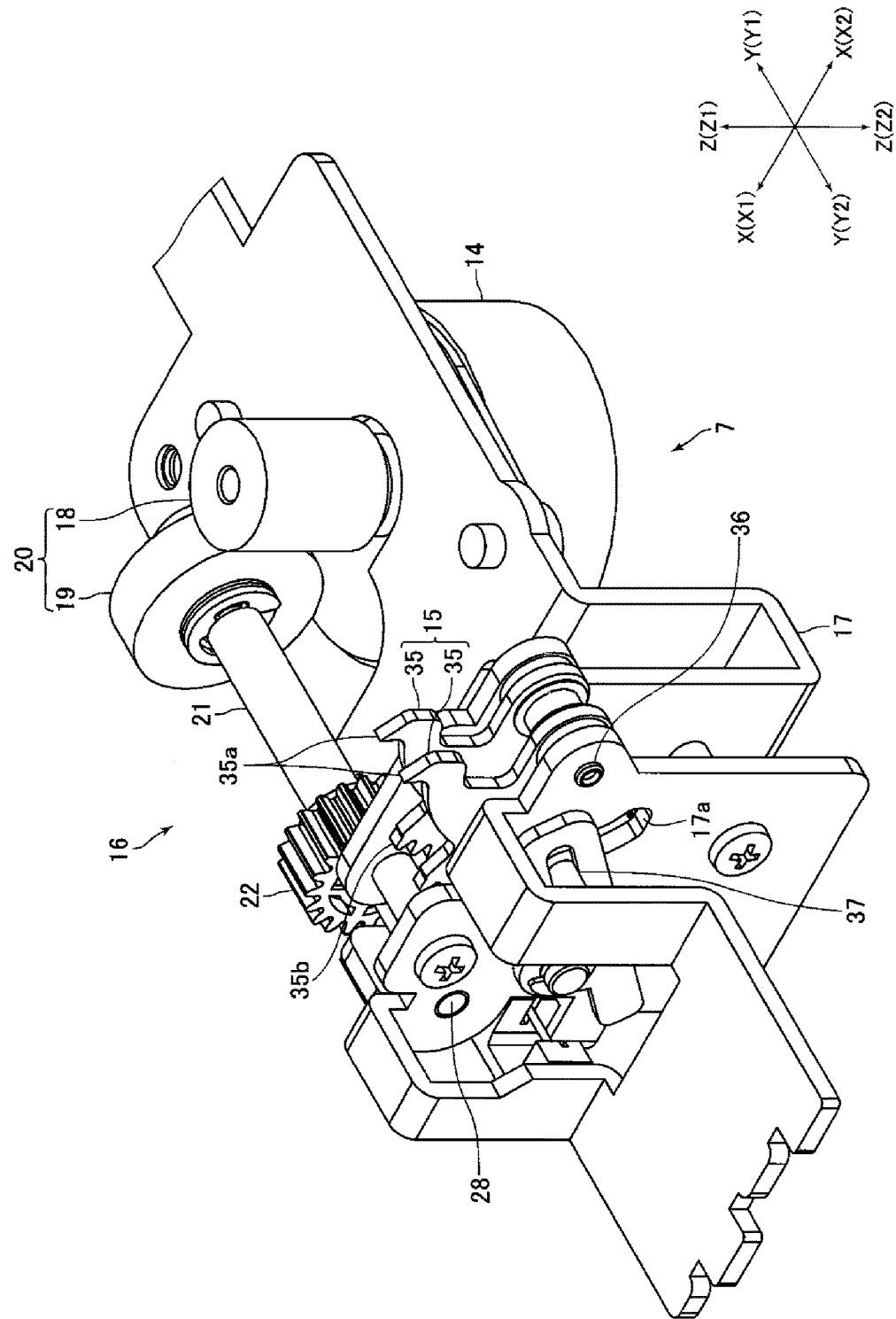
FIG. 3 is a perspective view showing a state that a lower frame is detached from a state shown in FIG. 2.
Figure 4:
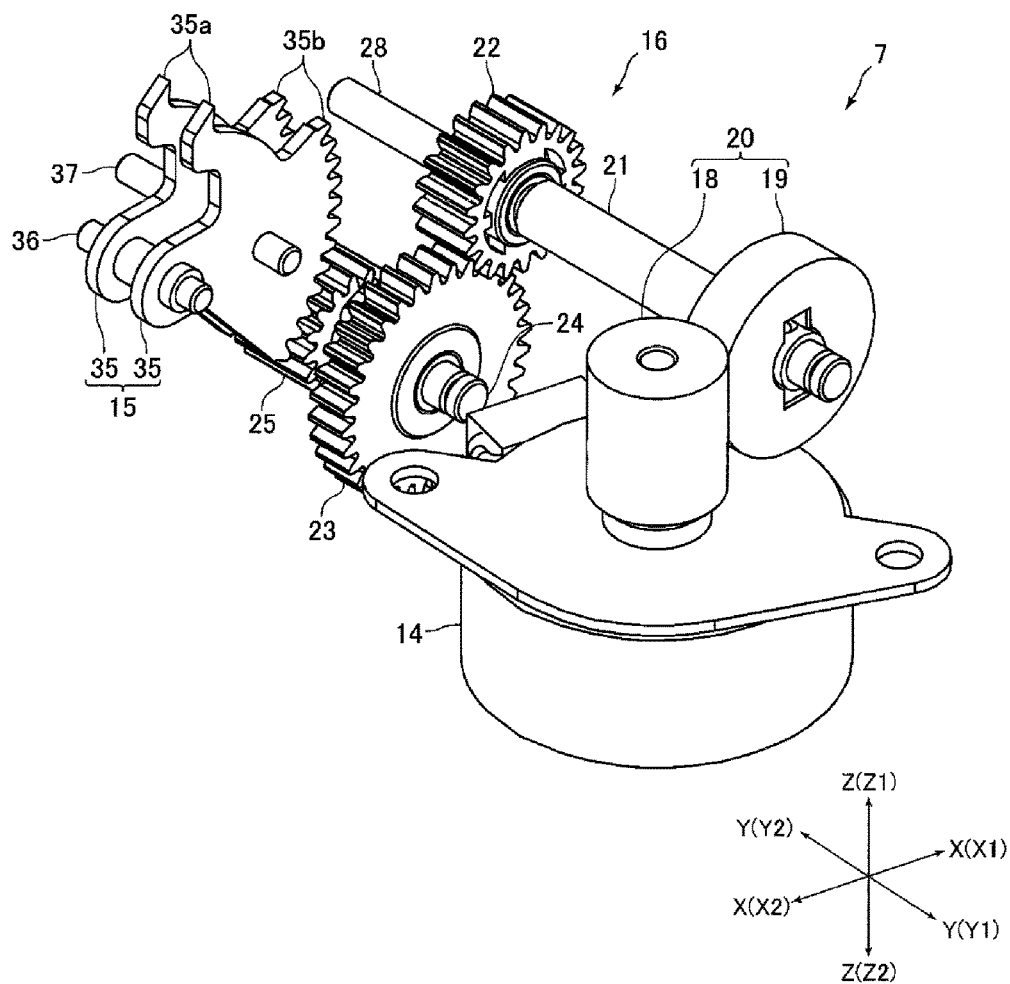
FIG. 4 is a perspective view showing a card lock mechanism in FIG. 3 which is viewed from another direction.
Figure 5:
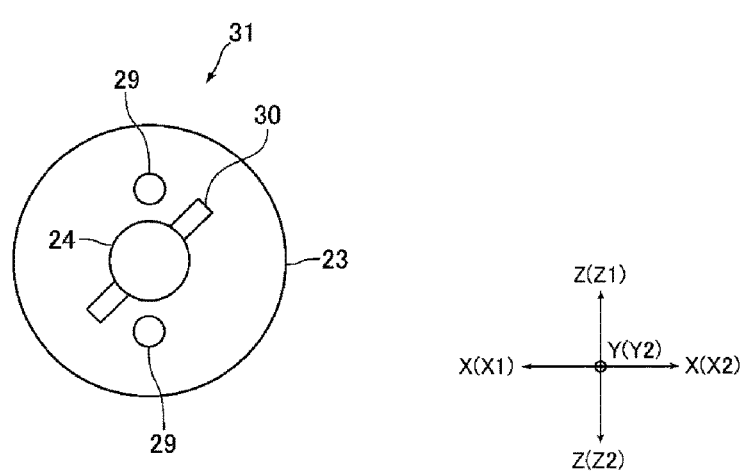
FIG. 5 is a schematic view showing a structure of a pin clutch which is disposed between a second spur gear and a second rotation shaft shown in FIG. 4.

FIG. 3 is a perspective view showing a state that a lower frame 13 is detached from a state shown in FIG. 2. FIG. 4 is a perspective view showing a card lock mechanism 7 shown in FIG. 3 which is viewed from another direction. FIG. 5 is an explanatory schematic view showing a structure of a pin clutch 31 which is disposed between a spur gear 23 and a rotation shaft 24 shown in FIG. 4.

The card lock mechanism 7 includes a motor 14, a lock member 15 configured to prevent drawing of a card 2, and a power transmission mechanism 16 structured to transmit power of the motor 14 to the lock member 15. The card lock mechanism 7 is disposed to a lower side of the card conveying passage "W". Specifically, the card lock mechanism 7 is, as shown in FIG. 2, disposed on a lower side with respect to a lower frame 13 which structures a lower face portion of the card conveying passage "W" in the card insertion part 4. The lower frame 13 is formed with a passage opening 13*a* where prevention pawls 35*a* described below structuring the lock member 15 are passed so as to penetrate in the upper and lower direction.

The motor 14 is fixed to a support frame 17 so that its output shaft is protruded to an upper side. The support frame 17 is fixed to a lower side of the lower frame 13. The power transmission mechanism 16 includes a worm gear 20 structured of a screw gear 18 fixed to the output shaft of the motor 14 and a helical gear 19 engaged with the screw gear 18, a rotation shaft 21 as a first rotation shaft to which the helical gear 19 is fixed, a spur gear 22 as a first spur gear which is fixed to the rotation shaft 21, a spur gear 23 as a second spur gear which is engaged with the spur gear 22, a rotation shaft 24 as a second rotation shaft to which the spur gear 23 is relatively rotatably held, and a spur gear 25 as a third spur gear which is fixed to the rotation shaft 24. The spur gear 25 is engaged with a teeth part 35b formed on a lock plate 35 described below structuring the lock member 15. Therefore, in a transmitting direction of power from the motor 14 to the lock member 15, when the motor 14 side is referred to as a former stage and the lock member 15 side is referred to as a latter stage, the screw gear 18 is disposed on the former stage (in other words, motor 14 side) relative to the helical gear 19 in the transmitting direction of power from the motor 14 to the lock member 15.

The rotation shaft 21 is disposed so that its axial direction and the right and left direction are coincided with each other. Further, the rotation shaft 21 is formed in a hollow shape. In other words, the rotation shaft 21 is formed in a long and thin cylindrical tube shape. A fixed shaft 28 is inserted on an inner peripheral side of the rotation shaft 21. The fixed shaft 28 is fixed to the support frame 17 so that its axial direction and the right and left direction are coincided with each other. The helical gear 19 is fixed to a right end side of the rotation shaft 21 and the spur gear 22 is fixed to a left end side of the rotation shaft 21.

The rotation shaft 24 is disposed so that its axial direction and the right and left direction are coincided with each other. Further, the rotation shaft 24 is rotatably held by the support frame 17. The spur gear 23 is relatively rotatably held by the rotation shaft 24 on a right end side of the rotation shaft 24. The spur gear 25 is fixed to a left end side of the rotation shaft 24. A left side face of the spur gear 23 is fixed with two gear side pins 29 in a cylindrical shape so as to protrude to the left direction (see FIG. 5). The two gear side pins 29 are fixed to the spur gear 23 with 180° pitch with the rotation shaft 24 as a center. The rotation shaft 24 is fixed with a shaft side pin 30 protruding to both sides in its radial direction (see FIG. 5). The shaft side pin 30 is fixed to the rotation shaft 24 so as to be capable of contacting with the two gear side pins 29. In this embodiment, a pin clutch 31 is structured by the two gear side pins 29 and the shaft side pin 30 so that power transmission between the spur gear 23 and the rotation shaft 24 is connected and disconnected in the power transmission path between the motor 14 and the lock member 15.

The lock member 15 is provided with two lock plates 35 which are formed with prevention pawls 35a configured to contact with a card 2 and prevent drawing of the card 2. The lock plate 35 is formed with a teeth part 35b engaging with the spur gear 25 in addition to the prevention pawl 35a. The lock plate 35 is formed in a flat plate shape whose thickness direction is the right and left direction. A front upper end side of the lock plate 35 is turnably held by a fixed shaft 36 which is fixed to the support frame 17. In other words, the front upper end side of the lock member 15 is turnably held by the fixed shaft 36. The fixed shaft 36 is disposed so that its axial direction and the right and left direction are coincided with each other. The two lock plates 35 are held by the fixed shaft 36 with a predetermined space therebetween in the right and left direction.

The prevention pawl 35a is formed on an upper end side of the lock plate 35. The prevention pawl 35a is disposed on a rear side relative to the fixed shaft 36. The prevention pawl 35a is formed in a triangular shape whose width becomes narrower as going toward its tip end side when viewed in the right and left direction. In other words, a tip end of the prevention pawl 35a is pointed. The teeth part 35b is structured of a plurality of teeth configured to engage with the spur gear 25. This teeth part 35b is formed on the rear end side of lock plate 35. Specifically, a rear end side portion of the lock plate 35 is formed in a fan shape with the fixed shaft 36 as a center when viewed in the right and left direction and the teeth part 35b is formed on a rear end face of the lock plate 35.

The lock member 15 is disposed to a lower side of the card conveying passage "W" so that the prevention pawls 35a are contacted with a card 2 from a lower side. Further, the lock member 15 is disposed so that the prevention pawls 35a are passed the passage opening 13a of the lower frame 13 to be contacted with a card 2 from a lower side.

The lock member 15 is movable between a contact position where the prevention pawls 35a are contacted with a card 2 and a retreated position where the prevention pawls 35a are retreated from the card conveying passage "W" by power transmitted from the motor 14 through the power transmission mechanism 16. In other words, the lock member 15 is turned with the fixed shaft 36 as a center and is moved between the contact position and the retreated position by power transmitted from the motor 14. When the lock member 15 is located at the retreated position, the prevention pawls 35a are disposed to a lower side of the lower frame 13 and are not contacted with a card 2. On the other hand, when the lock member 15 is located at the contact position, as shown in FIG. 2, tip end sides of the prevention pawls 35a are protruded to an upper side of the lower frame 13 and are capable of contacting with a card 2. In this case, base end sides of the prevention pawls 35a are disposed in an inside of the passage opening 13a.

In this embodiment, when the motor 14 is rotated so that the spur gear 25 is turned in a clockwise direction in FIG. 4 (hereinafter, this direction is referred to as a "clockwise direction"), the lock member 15 is turned in a counterclockwise direction in FIG. 4 (hereinafter, this direction is referred to as a "counterclockwise direction") with the fixed shaft 36 as a center, and the lock member 15 is moved toward the contact position from the retreated position. Further, when the motor 14 is rotated so that the spur gear 25 is turned in the counterclockwise direction, the lock member 15 is turned in the clockwise direction with the fixed shaft 36 as a center and the lock member 15 is moved toward the retreated position from the contact position. The counterclockwise direction in this embodiment is a first direction which is a turning direction of the lock member 15 when the lock member 15 is moved toward the contact position from the retreated position.

The lock member 15 is fixed with guide pins 37 which are protruded to both sides in the right and left direction. The guide pins 37 are engaged with guide grooves 17a (see FIG. 3) which are formed in the support frame 17. The lock member 15 moved between the contact position and the retreated position are guided by the guide pins 37 and the guide grooves 17a.

When the lock member 15 is located at the contact position, the prevention pawls 35a are, as shown in FIG. 2, inclined toward a rear side as going toward an upper side. Specifically, the prevention pawls 35a are protruded toward a rear upper side so that, when the lock member 15 is located at the contact position, a tip end of the prevention pawl 35a formed in a triangular shape is directed to a rear upper side.

When drawing force to a front side is applied to a card 2 in a state that the prevention pawls 35a are contacted with the card, turning force is generated in the counterclockwise direction in the lock member 15. As described above, a front upper end side of the lock member 15 is turnably held by the fixed shaft 36 and, when the lock member 15 is located at the contact position, the prevention pawls 35a are protruded toward a rear upper side so that the tip ends of the prevention pawls 35a are directed toward the rear upper side. Therefore, when drawing force toward a front side is applied to a card 2 in a state that the prevention pawls 35a are contacted with the card 2, the tip ends of the prevention pawls 35a stick into the card 2. In other words, the tip end of the prevention pawl 35a is formed in a pointed shape so as to stick into a card 2 when drawing force toward a front side is applied to the card 2 in a state that the prevention pawl 35a is contacted with the card 2.

(Principal Effects in this Embodiment)

As described above, in this embodiment, the power transmission mechanism 16 structured to transmit power of the motor 14 to the lock member 15 includes the worm gear 20 and a reduction gear ratio of the worm gear 20 can be increased. Therefore, according to this embodiment, even when the number of gears structuring the power transmission mechanism 16 is reduced, a reduction gear ratio in a transmission path of power from the motor 14 to the lock member 15 can increased. Accordingly, in this embodiment, even when a small motor 14 is used, contact pressure of the prevention pawl 35a with a card 2 can be secured. As described above, in this embodiment, even when the number of gears structuring the power transmission mechanism 16 is reduced or, even when a small motor 14 is used, contact pressure of the prevention pawl 35a with a card 2 can be secured. Therefore, while securing contact pressure of the prevention pawl 35a with a card 2, the size of the card lock mechanism 7 can be reduced.

In this embodiment, the worm gear 20 is disposed in the transmission path of power from the motor 14 to the lock member 15. Therefore, even when a criminal tries to push the lock member 15 in a direction from the contact position to the retreated position by using a certain tool inserted from the card insertion port 3, the helical gear 19 is hardly turned because turning of the helical gear 19 is prevented by the screw gear 18. Accordingly, in this embodiment, movement of the prevention pawl 35a can be prevented until the contact state of the prevention pawl 35a with a card 2 is released. Therefore, even when a criminal tries to draw a card 2 in a contacted state with the prevention pawl 35a from the card insertion port 3 by using a tool, drawing of the card 2 from the card insertion port 3 can be prevented by operation of the prevention pawl 35a. As a result, in this embodiment, phishing can be prevented surely.

Especially, in this embodiment, the tip end of the prevention pawl 35a is pointed so as to stick into a card 2 when drawing force to a front side is applied to the card 2 in a contacted state with the prevention pawl 35a. Therefore, when a criminal tries to draw a card 2 in a contacted state with the prevention pawl 35a from the card insertion port 3, the tip end of the prevention pawl 35a sticks into the card 2. Accordingly, in this embodiment, drawing of a card 2 from the card insertion port 3 can be prevented effectively and, as a result, phishing can be prevented further surely.

In this embodiment, the card reader 1 is structured to convey a card 2 in a short-side direction of the card 2. Further, in this embodiment, the magnetic head is disposed so as to face the card conveying passage "W" from a lower side with respect to the card conveying passage "W". In other words, in this embodiment, a card 2 is taken into the inside from the card insertion port 3 in a state that its face on a side where a magnetic stripe is formed is directed to a lower side. Further, in this embodiment, the lock member 15 is disposed to a lower side of the card conveying passage "W" so that the prevention pawl 35a is contacted with a card 2 from a lower side. In other words, in this embodiment, the lock member 15 is disposed so that the prevention pawl 35a is contacted with a card 2 face on a side where a magnetic stripe is formed. Therefore, according to this embodiment, even if a card 2 has been drawn by a criminal in a state that the prevention pawl 35a is contacted with the card 2, a magnetic stripe of the card 2 can be damaged by the prevention pawl 35a. Accordingly, in this embodiment, even if a card 2 has been drawn by a criminal in a state that the prevention pawl 35a is contacted with the card 2, the drawn card 2 can be prevented from being used.

(Other Embodiments)

Although the present invention has been shown and described with reference to a specific embodiment, various changes and modifications will be apparent to those skilled in the art from the teachings herein.

In the embodiment described above, the power transmission mechanism 16 includes the spur gears 23 and 25, and the spur gear 25 is engaged with the teeth part 35a of the lock member 15. However, the present invention is not limited to this embodiment. For example, the power transmission mechanism 16 may be structured so that the spur gear 22 is engaged with the teeth part 35a of the lock member 15. Further, in the embodiment described above, the power transmission mechanism 16 includes the spur gears 22, 23 and 25. However, the power transmission mechanism 16 may include a helical gear instead of the spur gears 22, 23 and 25. In this case, the teeth part 35b of the lock member 15 is formed so as to engage with the helical gear.

In the embodiment described above, the card 2 is a rectangular card made of vinyl chloride whose thickness is about 0.7-0.8 mm. However, the present invention is not limited to this embodiment. For example, the card 2 may be a PET (polyethylene terephthalate) card whose thickness is about 0.18-0.36 mm or may be a paper card having a predetermined thickness. Further, in the embodiment described above, a magnetic stripe is formed on a rear face of a card 2. However, a magnetic stripe may be formed on a front face of a card 2 instead of a rear face of the card 2. For example, a magnetic stripe in conformity with the standard of JISX6302 may be formed on a front face of a card 2. In this case, a magnetic head is disposed to an upper side of the card conveying passage "W". Further, in this case, it is preferable that the lock member 15 is disposed to an upper side of the card conveying passage "W" so that the prevention pawl 35a is contacted with a card 2 from an upper side. In other words, it is preferable that the card lock mechanism 7 is disposed to an upper side of the card conveying passage "W".

In the embodiment described above, the card reader 1 is structured so that a card 2 is conveyed in a short-side direction of the card 2 and predetermined processing is performed. However, the present invention is not limited to this embodiment. For example, the card reader 1 may be structured so that a card 2 is conveyed in a longitudinal direction of the card 2 and predetermined processing is performed. Further, in the embodiment described above, the lock member 15 is turnably held by the fixed shaft 36. However, the lock member 15 may be fixed to a turnable shaft which is turnably held by the support frame 17. In the embodiment described above, in a case that a card detection signal is generated by a sensor when the sensor for detecting a position of a card which is moved in the card conveying passage "W" should not be responded, a tip end side of the prevention pawl 35a protruding to an upper side of the lower frame 13 may be used as a shutter configured to open and close the card conveying passage "W".

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card, the card reader comprising:
   a card insertion port into which the card is inserted and from which the card is ejected;
   a card conveying passage where the card inserted from the card insertion port is conveyed; and
   a card lock mechanism structured to prevent drawing of the card from the card insertion port when an abnormality has been detected in conveyance of the card in the card conveying passage;
   wherein the card lock mechanism comprises:
      a motor;
      a lock member comprising with a prevention pawl configured to contact with the card and prevent drawing of the card and is moved between a contact position where the prevention pawl is contacted with the card and a retreated position where the prevention pawl is retreated from the card conveying passage by power transmitted from the motor; and
      a power transmission mechanism structured to transmit power of the motor to the lock member;
   wherein the power transmission mechanism comprises a worm gear comprising a screw gear and a helical gear engaged with the screw gear;
   wherein the screw gear is disposed on a motor side relative to the helical gear in a transmitting direction of power from the motor to the lock member,
   wherein the lock member further comprises a teeth part in a fan shape; and
   wherein the teeth part in the fan shape is driven through engagement of gears including the worm gear to move the prevention pawl.

2. The card reader according to claim 1, further comprising a magnetic head configured to perform at least one of reading of magnetic data recorded in the card and recording of magnetic data to the card,
   wherein the card reader is structured so that the card formed in a substantially rectangular shape is conveyed in a short-side direction of the card and is processed,
   wherein the magnetic head is disposed so as to face the card conveying passage from one side in a thickness direction of the card with respect to the card conveying passage, and
   wherein the lock member is disposed on the one side in the thickness direction of the card with respect to the card conveying passage so that the prevention pawl is contacted with the card from the one side in the thickness direction of the card with respect to the card conveying passage.

3. The card reader according to claim 1, wherein the power transmission mechanism comprises:
   the screw gear fixed to an output shaft of the motor;
   a first rotation shaft to which the helical gear is fixed;
   a first spur gear which is fixed to the first rotation shaft;
   a second spur gear which is engaged with the first spur gear;
   a second rotation shaft by which the second spur gear is relatively turnably held;
   a third spur gear which is fixed to the second rotation shaft;
   two gear side pins which are fixed to a side face of the second spur gear so as to protrude in an axial direction of the second rotation shaft; and
   a shaft side pin which is fixed to the second rotation shaft so as to protrude to both sides in a radial direction of the second rotation shaft and to be capable of contacting with the two gear side pins,
   wherein a pin clutch is structured of the two gear side pins and the shaft side pin, the pin clutch being configured to connect and disconnect power transmission between the second spur gear and the second rotation shaft in a power transmission path between the motor and the lock member,
   wherein the lock member is formed with the teeth part in the fan shape which is engaged with the third spur gear,
   wherein the card lock mechanism comprises a fixed shaft which turnably holds the lock member or a turnable shaft which is turned together with the lock member, and
   wherein the lock member is turned with the fixed shaft or the turnable shaft as a center to be moved between the contact position and the retreated position.

4. The card reader according to claim 3, wherein
   in a case that a turning direction of the lock member moved from the retreated position to the contact position is referred to as a first direction,
   when drawing force in an ejecting direction of the card is applied to the card in a state that the prevention pawl is contacted with the card, turning force in the first direction is applied to the lock member, and
   a tip end of the prevention pawl is formed in a pointed shape so as to stick into the card when drawing force in the ejecting direction of the card is applied to the card in the state that the prevention pawl is contacted with the card.

5. The card reader according to claim 3, wherein
   the motor is disposed so that the thickness direction of the card conveyed along the card conveying passage and an axial direction of the output shaft are parallel to each other, and
   the first rotation shaft and the second rotation shaft are disposed so that a width direction of the card perpendicular to a conveying direction of the card conveyed along the card conveying passage and the thickness direction of the card is parallel to axial directions of the first rotation shaft and the second rotation shaft.

6. The card reader according to claim 3, wherein the second rotation shaft is disposed between one end of the motor and the other end of the motor in the thickness direction of the card.

7. The card reader according to claim 3, wherein
   the helical gear is disposed on one side in a width direction of the card conveying passage relative to the first spur gear,
   the gear side pin is fixed to a side face of the second spur gear on the other side in the width direction of the card conveying passage so as to protrude to the other side in the width direction of the card conveying passage, and the shaft side pin, the third spur gear and the lock member are disposed on the other side in the width direction of the card conveying passage relative to the second spur gear.

8. The card reader according to claim 3, wherein
the motor is disposed so that the output shaft is protruded toward the card conveying passage in the thickness direction of the card, and
the prevention pawl is structured to move in a direction that the output shaft of the motor is protruded when the lock member is moved from the retreated position to the contact position.

9. The card reader according to claim 2, wherein
the power transmission mechanism comprises:
the screw gear fixed to an output shaft of the motor;
a first rotation shaft to which the helical gear is fixed;
a first spur gear which is fixed to the first rotation shaft;
a second spur gear which is engaged with the first spur gear;
a second rotation shaft by which the second spur gear is relatively turnably held;
a third spur gear which is fixed to the second rotation shaft;
two gear side pins which are fixed to a side face of the second spur gear so as to protrude in an axial direction of the second rotation shaft; and
a shaft side pin which is fixed to the second rotation shaft so as to protrude to both sides in a radial direction of the second rotation shaft and to be capable of contacting with the two gear side pins,
wherein a pin clutch comprises the two gear side pins and the shaft side pin, the pin clutch being configured to connect and disconnect power transmission between the second spur gear and the second rotation shaft in a power transmission path between the motor and the lock member,
wherein the lock member comprises the teeth part in the fan shape which is engaged with the third spur gear,
wherein the card lock mechanism comprises a fixed shaft which turnably holds the lock member or a turnable shaft which is turned together with the lock member, and
wherein the lock member is turned with the fixed shaft or the turnable shaft as a center to be moved between the contact position and the retreated position.

10. The card reader according to claim 9, wherein
in a case that a turning direction of the lock member moved from the retreated position to the contact position is referred to as a first direction,
when drawing force in an ejecting direction of the card is applied to the card in a state that the prevention pawl is contacted with the card, turning force in the first direction is applied to the lock member, and
a tip end of the prevention pawl is formed in a pointed shape so as to stick into the card when drawing force in the ejecting direction of the card is applied to the card in the state that the prevention pawl is contacted with the card.

11. The card reader according to claim 9, wherein
the motor is disposed so that the thickness direction of the card conveyed along the card conveying passage and an axial direction of the output shaft are parallel to each other, and
the first rotation shaft and the second rotation shaft are disposed so that a width direction of the card perpendicular to a conveying direction of the card conveyed along the card conveying passage and the thickness direction of the card is parallel to axial directions of the first rotation shaft and the second rotation shaft.

12. The card reader according to claim 9, wherein the second rotation shaft is disposed between one end of the motor and the other end of the motor in the thickness direction of the card.

13. The card reader according to claim 9, wherein
the helical gear is disposed on one side in a width direction of the card conveying passage relative to the first spur gear,
the gear side pin is fixed to a side face of the second spur gear on the other side in the width direction of the card conveying passage so as to protrude to the other side in the width direction of the card conveying passage, and
the shaft side pin, the third spur gear and the lock member are disposed on the other side in the width direction of the card conveying passage relative to the second spur gear.

14. The card reader according to claim 9, wherein
the motor is disposed so that the output shaft is protruded toward the card conveying passage in the thickness direction of the card, and
the prevention pawl is moved in a direction that the output shaft of the motor is protruded when the lock member is moved from the retreated position to the contact position.

15. The card reader according to claim 1, wherein
the card lock mechanism comprises a fixed shaft which turnably holds the lock member or a turnable shaft which is turned together with the lock member,
the lock member is turned with the fixed shaft or the turnable shaft as a center to be moved between the contact position and the retreated position,
in a case that a turning direction of the lock member moved from the retreated position to the contact position is referred to as a first direction,
when drawing force in an ejecting direction of the card is applied to the card in a state that the prevention pawl is contacted with the card, turning force in the first direction is applied to the lock member, and
a tip end of the prevention pawl is formed in a pointed shape so as to stick into the card when drawing force in the ejecting direction of the card is applied to the card in the state that the prevention pawl is contacted with the card.

16. A card reader for use with a card, the card reader comprising:
a card insertion port into which the card is inserted and from which the card is ejected;
a card conveying passage where the card inserted from the card insertion port is conveyed; and
a card lock mechanism structured to prevent drawing of the card from the card insertion port when the card has been abnormally stopped in the card conveying passage and the card has been clogged in the card conveying passage;
wherein the card lock mechanism comprises:
a motor;
a lock member comprising a prevention pawl configured to contact with the card for preventing drawing of the card and is moved between a contact position where the prevention pawl is contacted with the card and a retreated position where the prevention pawl is retreated from the card conveying passage by power transmitted from the motor; and
a power transmission mechanism structured to transmit power of the motor to the lock member;

wherein the lock member further comprises a teeth part in a fan shape; and wherein the teeth part in the fan shape is driven by a gear structuring power transmission mechanism.

17. The card reader according to claim 16, further comprising a magnetic head configured to perform at least one of reading of magnetic data recorded in the card and recording of magnetic data to the card, wherein the card reader is structured so that the card formed in a substantially rectangular shape is conveyed in a short-side direction of the card and is processed, wherein the magnetic head is disposed so as to face the card conveying passage from one side in a thickness direction of the card with respect to the card conveying passage, and wherein the lock member is disposed on the one side in the thickness direction of the card with respect to the card conveying passage so that the prevention pawl is contacted with the card from the one side in the thickness direction of the card with respect to the card conveying passage.

18. A card lock mechanism structured to be mounted and used in a card reader having a card insertion port into which a card is inserted and from which the card is ejected and a card conveying passage where the card inserted from the card insertion port is conveyed, the card lock mechanism being structured to prevent drawing of the card from the card insertion port when the card has been abnormally stopped in the card conveying passage and the card has been clogged in the card conveying passage, the card lock mechanism comprising:

a motor;

a lock member which comprising a prevention pawl configured to contact with the card for preventing drawing of the card and is moved between a contact position where the prevention pawl is contacted with the card and a retreated position where the prevention pawl is retreated from the card conveying passage by power transmitted from the motor; and a power transmission mechanism structured to transmit power of the motor to the lock member;

wherein the lock member further comprises a teeth part in a fan shape; and wherein the teeth part in the fan shape is driven by a gear structuring power transmission mechanism.

* * * * *